United States Patent [19]

Goodwin

[11] Patent Number: 5,286,138
[45] Date of Patent: Feb. 15, 1994

[54] VEHICLE POSITIONING METHODS AND APPARATUS WITH IMPACT DAMPER

[75] Inventor: Jon D. Goodwin, Cedar Rapids, Iowa

[73] Assignee: Cedarapids, Inc., Cedar Rapids, Iowa

[21] Appl. No.: 678,687

[22] Filed: Apr. 1, 1991

Related U.S. Application Data

[62] Division of Ser. No. 448,055, Dec. 8, 1989, Pat. No. 5,004,394.

[51] Int. Cl.⁵ .............................. E01C 69/18; 404 108; 293 104;125;134
[52] U.S. Cl. .................................. 404/108; 293/134

[56] References Cited

U.S. PATENT DOCUMENTS

| | | | |
|---|---|---|---|
| 1,037,524 | 9/1912 | Plato | 293/134 X |
| 1,380,259 | 6/1921 | Whitaker, Jr. | 293/107 |
| 1,383,892 | 7/1921 | Whitter | 293/135 |
| 1,422,546 | 7/1922 | Demmer | 293/135 X |
| 1,504,505 | 8/1924 | Reed et al. | 193/134 X |
| 1,516,272 | 11/1924 | Geakumis | 293/135 |
| 1,594,866 | 7/1926 | Christinzio | 293/134 X |
| 1,637,152 | 7/1927 | Kehrer | 293/135 X |
| 1,723,508 | 8/1929 | Hansen | 293/134 X |
| 1,805,414 | 5/1931 | Ohlerdort | 293/135 X |
| 2,168,908 | 8/1939 | Lewis | 293/118 |
| 2,260,277 | 10/1941 | Mercier | 293/134 X |
| 2,274,440 | 2/1942 | Tozier | 293/134 X |
| 2,628,118 | 2/1953 | Gunnels, Jr. | 293/134 X |
| 2,822,937 | 2/1958 | Fox | 414/343 |
| 2,873,994 | 2/1959 | Omps | 293/134 |
| 2,919,142 | 12/1959 | Wing et al. | 293/DIG. 1 X |
| 3,260,536 | 7/1966 | Sundby | 293/134 X |
| 3,349,865 | 10/1967 | Deutsch | 293/134 X |
| 3,361,042 | 1/1968 | Cutler | 404/77 |
| 3,647,096 | 3/1972 | Holland | 414/343 X |
| 3,670,909 | 6/1972 | Holland | 414/343 X |
| 3,834,483 | 9/1974 | Palmer | 293/134 X |
| 3,834,686 | 9/1974 | Moritz et al. | 293/134 X |
| 3,854,706 | 12/1974 | Johnston | 267/116 |
| 3,893,726 | 7/1975 | Strohscheir | 293/134 |
| 4,014,582 | 3/1977 | Mackenzie | 293/134 X |
| 4,332,505 | 6/1982 | Mauldin | 404/108 |
| 4,783,171 | 11/1988 | Zimmermann | 414/343 X |
| 4,818,139 | 4/1989 | Brock et al. | 404/81 |

FOREIGN PATENT DOCUMENTS

| | | | |
|---|---|---|---|
| 2243076 | 3/1974 | Fed. Rep. of Germany | 293/134 |
| 1421565 | 9/1988 | U.S.S.R. | 293/132 |

OTHER PUBLICATIONS

The Barber-Greene Edge (Fall, 1987).
Cedarrapids Inc. Sales Manual, Section 2, Division 7, Form 19116 (Sep. 1989).
Barber-Greene Technical Bulletin No. T-7420 "Producing Smoother Pavements, with Longer Aspalt Paper Screen", martenson, 1988.
Cedarrapids Inc. Forms 19103-1-CR-Sep. 1989, 19103-2-CR-Sep. 1989, 19103-3-CR-Sep. 1989; "Fractional Description Traction and Drives MS3".
Cedarrapids Inc. Form 19103-4-CR-Sep. 1989, "Comparison MS3".
Skefs of Cedarrapids Shock Absorber, Nov. 3, 1989, Donald W. Smith.

*Primary Examiner*—William P. Neuder
*Attorney, Agent, or Firm*—Simmons, Perrine, Albright & Ellwood

[57] ABSTRACT

A push roll assembly mounted to a material receiving apparatus, such as a paver or other material receiving machine, includes a resilient link which allows energy transferred during contact of a supply truck with the push rolls to be gradually transferred to the material receiving machine, to thereby smoothen the impact between such truck and the machine.

19 Claims, 2 Drawing Sheets

VEHICLE POSITIONING METHODS AND APPARATUS WITH IMPACT DAMPER

This is a division of copending application Ser. No. 07/448,055 filed on Dec. 8, 1989, now U.S. Pat. No. 5,004,394.

BACKGROUND OF THE INVENTION

1. Field of the Invention

The invention relates generally to vehicle positioning methods and apparatus, such as vehicle stops and particularly to positioning stops known as truck push rolls and methods of positioning trucks by use of such truck push rolls. Such truck push rolls may be used in locating the rear of a material dump truck with respect to a dump location and particularly with respect to a continuously advancing dump location, for example, a feed hopper of a roadway paving machine.

2. Discussion of the Prior Art

Paving apparatus for laying down continuous strips of pavement necessarily requires a continuous supply of paving material. Typically, trucks deliver the material to the paving site. According to one preferred manner of operation, supply trucks with unloading provisions, such as tiltable beds, back up against a feed or supply hopper located at a front end of a paving machine or paver. When the rear of the truck bed is properly positioned with respect to the front of the feed hopper, the bed is raised and the paving material, such as asphaltic aggregate material, is transferred to the feed hopper of the paver.

Construction equipment, such as dump trucks, paving machines or similar type of apparatus are typically constructed for rugged use. Thus typically the equipment does not include bumpers, or even shock absorbing bumpers, as may have been provided for automobiles or even boat hulls for docking purposes. The intent of such shock absorbing bumpers is to protect the respective vehicle from damage due to contact with another object. The typical ruggedness with which the construction apparatus of interest has been regarded as not needing shock absorbing bumpers to afford such equipment protection from damage. A prior art problem of positioning trucks with respect to the feed hopper in the absence of bumpers was solved to accommodate the needs of the supply operation performed while the paving machine is constantly advancing.

The truck typically remains in position with respect to the feed hopper of the paver only while the material is being dumped into the hopper and immediately thereafter drives off to give way to the next truck. The change-over time between trucks is preferably minimized to optimize the time allocated to actually dumping the material into the feed hopper. Thus to quickly position each of the trucks with respect to the feed hopper, a truck positioning device known as truck push rolls is mounted to the front of the feed hopper of the respective machine to which the material is being transferred. Such push rolls are horizontally disposed rolls which are spaced to coincide with the track width of the trucks.

There are two types of state of the art push roll assemblies, push rolls with so called "truck hooks" and those without. The function of truck hooks is well known in the art. Truck hooks are retainers of trucks which typically engage both outer rear wheels of a truck in a clamshell type manner after the truck has become positioned against the push rolls. The hooks may be engaged manually, by overcentering mechanisms, or by hydraulic cylinders in a direct or remote operation. On level roadways and even on slight descending slopes, roughness of base grades may provide sufficient frictional resistance to retain supply trucks against push rolls, such that the use of truck hooks becomes unnecessary. Also, during the brief stop of a supply truck against a positioning stop, such as a push roll assembly, a truck operator may apply a slight pressure on the vehicle's brakes to maintain contact with the push rolls. In the further discussion of the invention and its background, it should be understood that problems addressed by the current invention relate to positioning the trucks. The current invention consequently applies equally to push roll assemblies with and without the so-called truck hooks.

Thus, in both instances, trucks back their wheels against the rolls which remain in contact with the truck wheels while the truck is dumping its load of material. A support structure of the rolls is typically pinned to the frame at the leading edge of the respective machine to allow a pivoting movement about a vertical axis through the centerline of the machine to allow for some misalignment of a truck backing into the rolls. The rolls consequently provide a simple apparatus for repetitively establishing and maintaining minimum spacing between the rear of the trucks and the front edge of the feed hopper. In case of an asphalt paving machine, as the paving machine advances, the truck is pushed forward and advances in an apparently fixed relationship with the paving machine, hence at a constant spacing with respect to its feed hopper. The material supplied by each truck allows the paver to advance but a short distance in its operation and frequent truck exchanges at the front of such feed hopper become a necessary operation to sustain a continuous paving process.

While state of the art push rolls allow the supply trucks to quickly position themselves with respect to the feed hopper to unload the material, the sudden contact by the tires of the loaded trucks appears to be the cause of a possible problem. The problem may be more severe when the drivers of the supply trucks are attempting to deliver the load of material in the shortest possible time. It appears that paving defects may be caused by the sudden impacts between the rear wheels of a fully loaded material supply truck and the push rolls. Considered to be defects are abrupt changes in the density of the material being paved, such as voids or bumps. They are believed to be caused when the screed of a paver is being jarred. Also, a sudden change in the forward speed of the paver may be the cause of such imperfections or paving defect.

Another inherent deficiency with state of the art push rolls is an inconsistency in positioning the rear of truck beds with respect to feed hoppers. Such inconsistency is the result of differences in trailing lengths of truck beds, differences in the lengths by which truck beds extend rearward beyond the rear set of tires of such trucks. When repeatability of the dumping position between trucks is desirable, such inconsistencies present a problem.

SUMMARY OF THE INVENTION

It is an object of the invention to provide a mechanism for eliminating paving defects which may be caused by sudden jolts transmitted by supply trucks backing against positioning devices such as truck rolls in advance of paving machines.

It is another object of the invention to provide a positioning mechanism for allowing a truck bed of a material dump truck to become positioned quickly with respect to a material feed hopper in a paving operation while minimizing the risk of a jolt by the truck generating an imperfection in strip of material being paved.

It is yet another object of the invention to dampen impact forces caused by engagement of truck push rolls at a leading edge of material intake hopper with truck tires of a material supply truck and transmitted to material processing equipment and a work product.

It is, hence, another object of the invention to facilitate the change-over rate of supply trucks and increase the delivery rate of materials to such road finishing machines as pavers to reduce occurrences of slow downs or stoppages in paving operations.

It is a further object of the invention to locate the rear of dump beds of material supply trucks at a most desirable position with respect to a feed hopper while allowing the rear tires of such trucks to be disposed at an indeterminate distance from a front edge of the feed hopper.

It is still another object of the invention to mount push rolls to a leading edge of apparatus adapted to become positioned with respect to the rear of a truck bed.

According to the invention, vehicle positioning apparatus includes a device for engaging the rear portions of tires in rolling contact. The tire engaging device is mounted to a support frame with an interposed mechanism providing resiliently yielding engagement by the tire engaging device. The support frame is positioned with respect to the front of a material transfer station for transferring material between the vehicle and the material transfer station.

According to a particular aspect of the invention, the positioning apparatus is mounted to the front of a material transfer station which is a feed hopper of apparatus moving in the direction of the vehicle, and the vehicle is a material supply truck having a tiltable bed.

According to another aspect of the invention, the positioning apparatus has the capability of having the tire engaging device extended or retracted with respect to the front edge of the feed hopper to correct for variations in a distance between the rear of the tires of the supply truck and the rear edge of the bed of the truck.

According to another aspect of the invention, a retraction of the tire engaging device is accomplished while the device is engaged with the tires of the supply truck and the supply truck is being positioned with respect to the feed hopper A particular method of positioning a bed of a material supply truck with respect to a material receiving apparatus includes resiliently controlling the position of push rolls which engage the truck to alleviate sudden relative motion changes between the truck and the material receiving machine.

Advantages resulting from the invention are a more consistent and quicker positioning of material delivery vehicles with respect to a material transfer point, such as, for example, a feed hopper of apparatus related to paving roadways.

BRIEF DESCRIPTION OF THE DRAWINGS

The Detailed Description of the Invention including a detailed description of a preferred embodiment thereof will be best understood when read in reference to the accompanying drawings wherein.

DETAILED DESCRIPTION OF THE INVENTION

Figure 1:
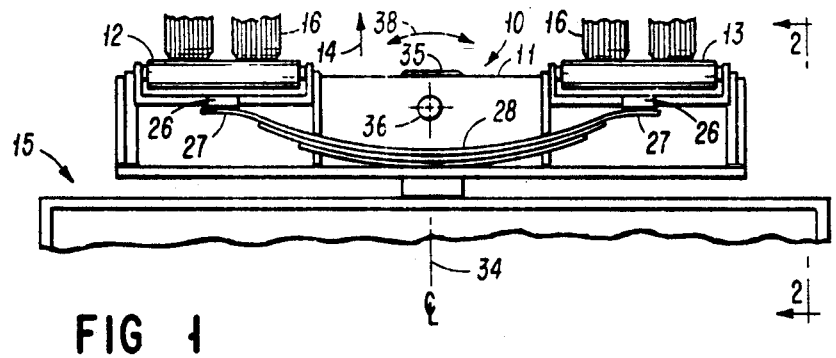
FIG. 1 is a simplified partial plan view of the space between a material supply truck and a material receiving machine, showing a push roll assembly as an embodiment of the current invention.
Figure 2:
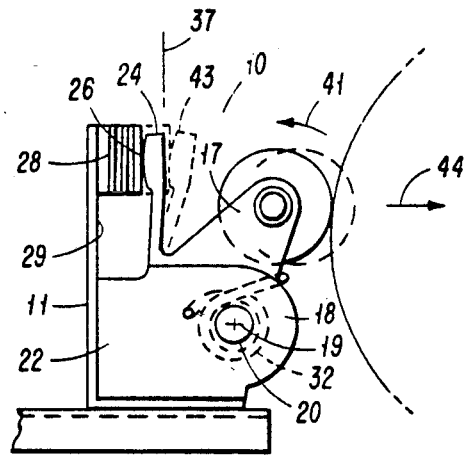
FIG. 2 is a side view of the push roll assembly in FIG. 1, as viewed from the direction "2—2" indicated in FIG. 1.

In reference to FIGS. 1 and 2, there is shown a push roll assembly designated generally by the numeral 10. The push roll assembly alleviates certain problems which tend to occur with prior art push roll assemblies. A main transverse support beam 11 of the push roll assembly 10 supports left and right push rolls 12 and 13, respectively, in spaced, yet axially substantially aligned relationship on opposite ends of the beam. The designation as left and right push rolls is in reference to an arrow 14. The arrow 14 indicates a preferred direction of travel of apparatus 15 (a front edge of which is shown in FIG. 1, for example). The apparatus 15 may be a paving machine or other apparatus adapted to receive material from a material supply truck (only tires 16 of which are shown) while both the material receiving apparatus 15 and the truck are advancing at substantially the same speed.

Each of the push rolls 12 and 13 are rotatably supported between spaced support ears 17 of a respective pivot bracket 18. The pivot bracket 18 pivots about a pivot axis 19 of a pivot shaft 20, the shafts 20 being supported at their ends in support plates 22 which are attached to the transverse main beam 11. As mounted in the pivot brackets 18 with respect to the axis 19 of the pivot shaft 20, the push rolls 12 and 13 are disposed to revolve about the pivot shaft 20. A thrust tongue 24 extends at a midpoint of its length radially outward from the respective pivot bracket 18. An outer contact pad 26 of the thrust tongue 24 rests in contact with outer ends 27 of a leaf spring 28. The leaf spring 28 is mounted to the center of an upright flange 29 of the main transverse beam 11 and extends along its length symmetrically outward to both sides of the center and into engagement with the respective tongues 24 of both right and left push roll pivot brackets 18.

Torsion springs 32 acting, for example, between a selected support ear 17 on each of the pivot brackets 18 and an adjacent one of the support plates 22 of the beam 11 may be employed to bias the pivot brackets 18 toward the leaf spring 28. With such a biasing arrangement, the outer contact pads 26 are urged into contact with the respectively adjacent outer ends 27 of the leaf spring 28, to remain in contact therewith even though no truck tires, such as the tires 16 are in engagement with the push rolls 12 and 13. It should be understood that such a biasing arrangement is solely for the purpose of preventing the push rolls 12 and 13 from pivoting downward under their own weight in the absence of a pushing force which may be exerted by contacting truck wheels 12 and 13.

The main transverse beam 11 is mounted in a centered position, as indicated by a centerline 34, on a forward extending tongue 35 of the material receiving apparatus 15. A preferably pivotable mount, such as by a vertical pivot bolt 36, enables the main beam 11 to pivot about a vertical axis 37 to either side from a normal transverse position, as indicated by the arrow 38. Such pivotal mounting of push rolls is known in the art as an "oscillating" push roll mount. The description relating to the oscillating mounting of the main beam is for illustrative purposes only. The pivotal movement of the beam 11 permits the beam to adjust to a minor angular misalignment between the direction of travel of the truck and the material receiving apparatus 15. Such pivotal capability extends through only a small angle to evenly distribute forces between the left and right push rolls 12 and 13 and no way affects the resiliently yielding action of the push rolls 12 and 13 as afforded by the embodiment described herein including the spring 28.

As shown particularly by the alternate position of the exemplary push roll 13 in FIG. 2, an initial or normal rest position of the push rolls 12 and 13 is in a forward pivoted position. As a truck backs with its tires 16 against the push rolls 12 and 13, at first an initial minor misalignment between the longitudinal axes of the truck and the material receiving apparatus will be corrected by a transverse pivotal movement or oscillation of the beam 11 about the axis 37. Next, the energy existing between the material receiving apparatus 15 and the truck will be transferred and become stored in the spring 28. The pivot bracket 18 will undergo pivotal movement as the push rolls 12 and 13 become displaced by the truck tires 16 toward the material receiving apparatus, as indicated by the arrow 41. The pivotal movement of the pivot bracket 18 pivots the thrust tongue 24 from its normal rest position indicated at 43 to a normally engaged position shown in FIG. 2. In reference to FIG. 2, in the course of pivoting from the rest position at 43 to the engaged position, the energy being stored in the spring 28 exerts a gradually increasing force through the push rolls 12 and 13 to the truck tires 16 in the direction indicated by an arrow 44. Such force by the push rolls 12 and 13 accelerates the truck in the direction of the arrow 44. As a result, the truck accelerates relative to the speed of the material receiving apparatus, such that the impact energy becomes distributed over an increased time period with a sudden impact peak of energy being eliminated by the push roll assembly 10.

It should be understood from the description of the function of the spring 28, that various changes and modifications are possible without departing from the spirit and scope of this invention. For example, in reference to FIG. 2, it would be possible to rotate the location of the spring 28 and, of course, the location of the corresponding thrust tongue 24 counterclockwise through, for example, a right angle to enable the spring to act in a substantially vertical direction. Also, space permitting, it is possible to change from one type of spring to another, thus replacing the leaf spring 28 with two, a right and a left coil spring which would be disposed to act against the respective thrust tongues 24. The amount of displacement of the spring and its selected spring constant are indicative of the amount of energy stored. The spring constant may be selected as a linear constant or a non-linear constant. Such a non-linearity would allow for normally smooth transfer and storage of energy with an accompanying smooth change of relative motion between the supply truck and the receiving apparatus 15, while protecting the operation of the receiving apparatus 15 against accidental jolts due to excessive differences in the motion of the two. Another change within the scope of the invention is contemplated in which the mechanical spring is replaced with a "hydraulic" spring. It has been found that employing a hydraulic system entails further advantages as will become apparent in reference to FIGS. 3 and 4.

Figure 3:
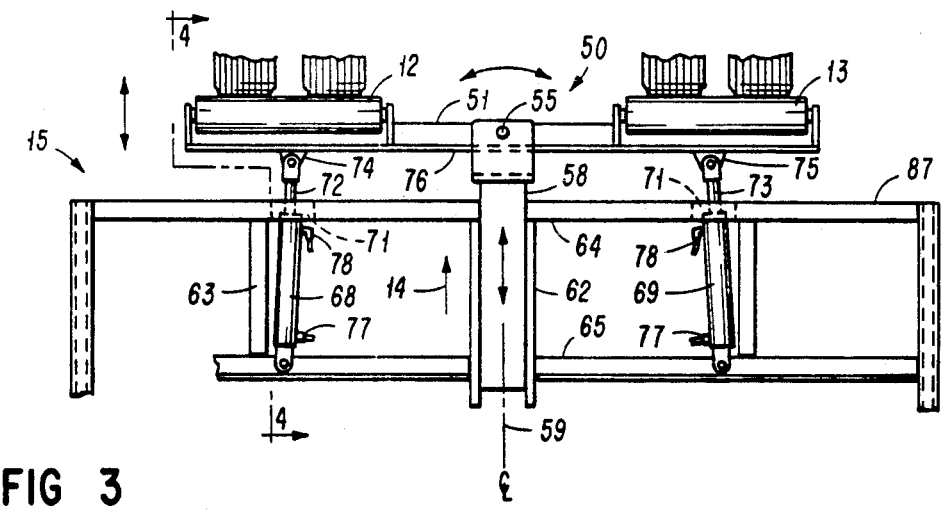
FIG. 3 is a simplified partial plan view of another, preferred embodiment of a push roll assembly further including a mechanism for extending and retracting the position of the push rolls.
Figure 4:
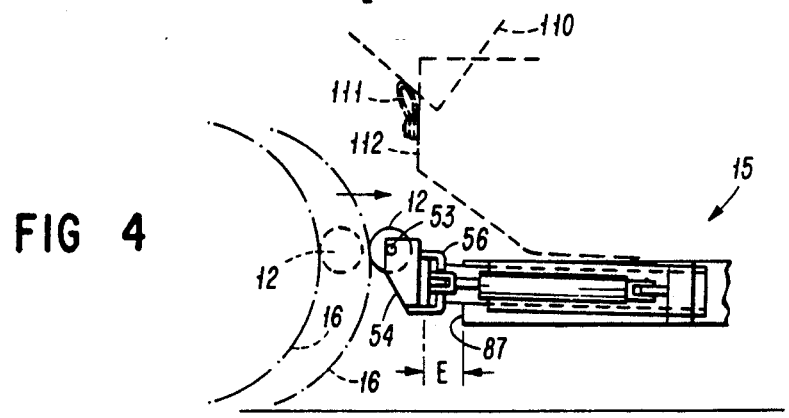
FIG. 4 is a simplified partial side view of the push roll assembly shown in FIG. 3, as viewed in the direction "4—4"

Referring now to FIGS. 3 and 4, a preferred embodiment of the invention implements certain features described with respect to FIGS. 1 and 2 with a "hydraulic" resilient arrangement. A push roll assembly 50 includes a main transverse support beam 51 to which the left and right push rolls 12 and 13 are rotatably mounted. In contrast to the embodiment depicted in FIGS. 1 and 2, the push rolls 12 and 13 are supported in bearings 53 of bearing brackets 54 which are solidly attached to the transverse beam 51. The transverse beam 51 is pivotably mounted at its center, such as by means of a vertically disposed pivot shaft 55 extending through a fork 56 at a leading edge of a sliding guide tongue 58. The guide tongue 58 is slidably supported for free sliding movement substantially along a centerline 59 of the material receiving apparatus 15. FIGS. 3 and 4 show portions of a support structure of such apparatus 15. The guide tongue 58 is preferably constructed of structural tubing of rectangular cross section. In support of its uni-directional sliding movement, the guide tongue is restrained in its movement by a guide tube 62 of complementary cross section to eliminate lateral or pivotal movement about the longitudinal extent of the guide tongue 58. The guide tube 62 is preferably welded into or otherwise solidly attached to a support frame 63 of the apparatus 15, such as between transverse front beam 64 and an intermediate transverse support beam 65. The transverse beam is consequently free to pivot in a substantially horizontal plane about the pivot shaft 55, and will undergo translational movement or displacement in the longitudinal direction of the material receiving apparatus 15 as supported by the sliding tongue 58.

Such translational movement is controlled by left and right hydraulic cylinders 68 and 69, respectively. Left and right sides, as well as front and rear are designated again with respect to a contemplated forward movement of the apparatus 15 in the direction of the arrow 14. The cylinders 68 and 69 are typical dual action hydraulic cylinders, having a preferred 2.5 inch piston diameter. In the preferred embodiment, the cylinders 68 and 69 are mounted on their respective sides of the apparatus 15 to the intermediate support beam 65 and extend forward through apertures 71 in the front support beam 64. Activators, such as the pistons within the cylinders 68 and 69, and their outward extending rods are collectively referred to herein as pistons. Pistons 72 and 73 are mounted to respective mounting lugs 74 and 75 extending from a rear face 76 of the tranverse beam 51. A transversely spaced position of the lugs 74 and 75 outward from the centerline 59 of the apparatus 15 is preferred to position the lugs substantially in line with the thrust exerted by tires 16 of a truck backing against the respective push rolls 12 and 13. Respective hydraulic couplings 77 and 78 couple the cylinders 68 and 69 into a hydraulic control circuit 80, which is best described in reference to the schematic diagram of the hydraulic circuit in FIG. 5.

Figure 5:
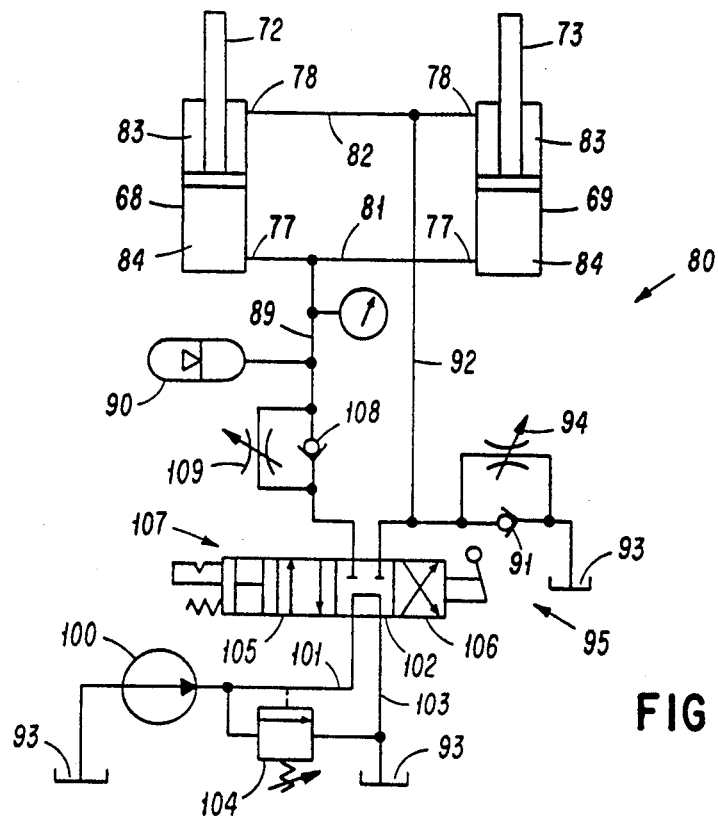
FIG. 5 is a schematic diagram of a hydraulic system preferred for the operation of the embodiment of the invention described with respect to FIGS. 3 and 4.

Referring to the schematic diagram of the hydraulic circuit 80 in FIG. 5, the cylinders 68 and 69 are coupled in parallel. A hydraulic line 81 is coupled between the respective extension couplings 77 of both cylinders 68 and 69, while a line 82 interconnects the retraction couplings 78 of the cylinders. Forward or retraction chambers 83 and rear extension chambers 84 of the cylinders 68 and 69 are pairwise interconnected and constitute a constant displacement volume. Consequently, for slight angular displacements of the transverse beam 51 about the pivot shaft 55 (see also FIG. 3), the left piston 68 extends or retracts by substantially the same amount as the right piston 69 retracts or extends. While combined volume of the two retraction chambers and the combined volume of the two extension chambers will remain constant, a complementary movement of the two pistons in opposite directions is supported. Thus, without further hydraulic activation, the previously described pivotal movement of the transverse beam 51 is supported by the interconnecting lines 81 and 82.

On the other hand, simultaneous retraction or extension of both pistons 72 and 73 cannot take place in the absence of other hydraulic control flow. An initially established position of the pistons 72 and 73 with respect to their cylinders 68 and 69 results in a fixed, corresponding extension distance "E" of the push roll assembly 50 from a leading edge 87 of the front support beam 64 (see FIG. 4). To support resiliently yielding motion of the push rolls 12 and 13 in accordance with the invention, the interconnecting line 81 is coupled through an extension supply line 89 to a typically gas charged accumulator 90. The amount of charge on the accumulator 90 is of course one of choice, though a charge to a pre-load of 200 pounds per square inch ("psi") has been found acceptable for typical operations as herein described. The preload to a certain pressure may also need to be evaluated or tested with respect to the particular diameter of the cylinders 68 and 69 selected. Such pre-load then becomes the equivalent of a bias force on a mechanical spring. A compression occurring simultaneously in both extension chambers 84 with a force resulting 31 in a pressure greater than 200 psi causes the accumulator to store hydraulic fluid against an increasing pressure. Such simultaneous compressive force exerted against the pistons 72 and 73 consequently results in the pistons 72 and 73 retracting in the respective cylinders 68 and 69 against the counterforce exerted by the accumulator 90. The retractile movement of the pistons 72 and 73 results in a vacuum being generated in the retraction chambers 83, such vacuum drawing hydraulic fluid through a check valve 91 and through a retraction supply line 92 from a reservoir 93 of the circuit or system 80. The check valve 91 is in parallel with a needle valve 94 having a variable orifice, the combination of the check valve 91 and the needle valve 94 constituting a flow control valve. In the operation of the system as described, the additional hydraulic fluid drawn into the retraction chamber, as a result of the sudden application of a compressive force against the pistons 72 and 73, is then slowly bled off through the needle valve 94 to cause the pistons to return to their originally established positions. The accumulator 90 in combination with the check valve 91 and the needle valve 94 function as a damped spring mechanism to allow the otherwise rigid assembly of the push rolls 12 and 13 as described with respect to FIGS. 3 and 4, to absorb and distribute a sudden impact. The accumulator functions in that respect in substantially the same manner as that of the embodiment described with respect to FIGS. 1 and 2. One functional distinction resides in an addition of the damped return of the push rolls 12 and 13 in the hydraulic implementation including the needle valve 94. Of course, a wide open setting of the needle valve would reduce the damping action. Another physically apparent distinction between the embodiment described with respect to FIGS. 1 and 2, and the hydraulic implementation of a preferred embodiment described with respect to FIGS. 3 and 4 lies in between which elements the resilient absorption takes place. In the mechanical embodiment, the force of a sudden movement is absorbed between the push rolls 12 and 13 and the beam 11. In the hydraulic embodiment the force of such sudden movement is absorbed between the corresponding beam 51 and the frame of the load receiving apparatus 15 as seen in reference to FIG. 3.

Again in reference to FIG. 5, the hydraulic embodiment described are further enhanced by a four-position control valve 95. The extension supply line 89 and the retraction supply line 92 are coupled to an output side of the control valve 95. The input side of the control valve 95 is coupled to a typical hydraulic power supply, including a pump 100 coupled to draw hydraulic fluid from the reservoir 93 and to apply it through an output line 101 to the pressure input side of the control valve 95. In a neutral position 102, shown in the schematic diagram as the normally engaged or rest position of the control valve 95, the valve 95 isolates the power circuit of the pump 100 from the supply lines 89 and 92 and returns the hydraulic fluid from the pump 100 through a return line 103 back to the reservoir 93. A pressure relief valve 104 is activated by a preset pressure in the output line 101 to route the hydraulic discharge from the pump 100 to the reservoir 93 when the pressure in the output line 101 from the pump 100 exceeds the preset pressure. In the preferred embodiment, the pressure relief valve 104 may be set, for example, to 1000 psi or another value in accordance with good engineering practices. It should be realized that in the neutral position 102, the hydraulic circuit on the output side of the control valve 95 functions as the hydraulic force distribution mechanism described above.

The control valve 95 is spring biased from positions adjacent the neutral position 102 toward the neutral position. A push roll extension position 105 may be positively activated, such as by manually activation, to couple the pump output line 101 to the extension supply line 81 and the retraction supply line 82 through the return line 103 to the reservoir 93. When the extension position 105 becomes positively activated, hydraulic fluid is pumped through the output line 101 and the extension supply line 89 to enter the extension chambers 84 and push the pistons 72 and 73 into an extended position, driving excess fluid from the retraction chambers 83 to the reservoir 93. As soon as the control valve 95 is released, the valve 95 returns to its neutral position 102 to arrest the motion of the pistons in their currently assumed positions.

A second valve position adjacent the neutral position 102 is a push roll retraction position 106. When the retraction position 106 becomes positively activated, the retraction position of the valve 95 couples the output line 101 of the pump to the retraction supply line 92 and the extension supply line 89 to the return line 103. Thus, during any activation period of the retraction position, hydraulic fluid is forced into the retraction chambers 83, its pressure bearing against the pistons 72 and 73, forcing the pistons to retract and forcing excess hydraulic fluid from the chambers 84 to return to the reservoir 93. As with the activation of the push roll extension position 105, a release of the push roll retraction position 106 causes the valve 95 to return to its neutral position 102. In the neutral position 102, the valve arrests further displacement of the pistons to locate the pistons in their then current positions.

A fourth position 107 of the control valve 95 is what is referred to as a "float position". The float position couples the extension supply line 89 and the retraction supply line 92 to each other and couples the supply lines and the output line 101 to the return line 103. Such an interconnection of the referred to lines substantially equalizes hydraulic pressures in the extension chambers 84 with respect to those in the retraction chambers 83. Consequently, the pistons 72 and 73 will remain in a predetermined position as established by prior operation of the control valve 95 at one or more of the previously described positions. The float position 107 further is a detented position of the valve 95. Thus, when an operator places the control valve into the detented position 107, the valve 95 will remain in that position against the urging of the spring bias toward the neutral position.

A difference in operation between the float position 107 and the neutral position 102 will become apparent when a truck backs its tires 16 against the push rolls 12 and 13. This distinction will better understood in reference to FIGS. 4 and 5. In an ideal mode of operation, an operator may have previously activated the push roll extension position 105. The pistons 72 and 73 are consequently fully extended. As a truck backs toward the material receiving apparatus 15 and into contact with the push rolls 12 and 13, the pistons 72 and 73 are suddenly urged toward the rear of the material receiving apparatus 15. A check valve 108 in the supply line 89 prevents the hydraulic fluid from escaping against the applied force from the extension chambers 84 of the cylinders 68 and 69. The spring action of the accumulator 90 comes into play to store and absorb the force resulting from the sudden impact against the push rolls 12 and 13. At the same time a needle valve 109 which parallels the check valve 108 allows hydraulic fluid to bleed from the part of the circuit of the extension chambers 84, whereby a slow retraction of the pistons 72 and 73, and hence of the push rolls 12 and 13 takes place. A gauge shown in the diagram of FIG. 5 without number may be used as an option if an adjustment of the needle valve 109 is preferred to be made by observing pressures sustained during the engagement of the needle valve. Thus depending of the adjustment setting of the needle valve 109, a truck, having engaged its tires 16 as shown in the alternate position of the push roll 12 in FIG. 4, may be allowed to further decrease its spacing to the material receiving apparatus 15, until, for example, a lower rear end of a truck, represented by the rear end of its bed 110 is located in a desirable position inboard of a leading or front edge 111 of, and above, a material receiving hopper 112. Depending on the amount of overhang of the truck bed 110 beyond the rear of the tires 16 a dimension "E" shown in FIG. 4 may differ between various trucks. In each instance, however, the same relationship between the bed 110 and the hopper 112 may be achieved by allowing the truck to approach the hopper 112 until the desired relationship is achieved.

When the truck bed 110 is desirably located with respect to the front edge 111 of the hopper 112, an operator simply releases the detented position and the control valve is urged into the neutral position 102. It should be understood, that the operation of the control valve may be manual or the valve may be automated in accordance with current practices. For example, a light beam interrupt mechanism (not shown) or other proximity sensor may be used to determine the correct position of the truck bed with respect to the front edge 111 of the hopper 112. A control signal then automatically activates the valve in the described manner. On its way to the neutral position the valve briefly engages the extension position 105. Such an engagement is merely transitory, and any effect may be an increase of the pressure on the extension side of the cylinder activation circuit. Inasmuch as an effective closing of the needle valve 109 in any case will result in an increase of hydraulic pressure and an increased absorption of such pressure by the accumulator, the brief engagement of the position 105 supports the desired effect of immediately fixing the position of the truck with respect to the material receiving apparatus 15.

Figure 6:
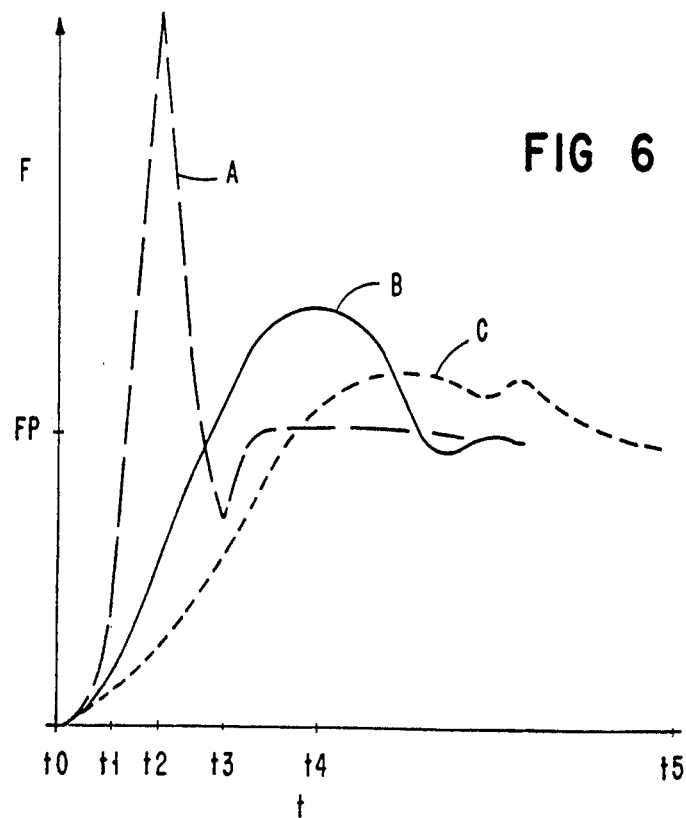
FIG. 6 is a graphical comparison of contact forces which may be encountered during the positioning of a material supply truck against the push rolls of a material receiving machine.

The diagrammatic chart in FIG. 6 gives a comparison of forces described herein with respect to the resilient absorption of sudden motion and their resulting forces. The diagram in FIG. 6 shows three approximations of forces encountered with respect to time as they are believed to be received by the load receiving apparatus as the tires 16 of a truck engage respective push rolls. Graph "A" represents what is believed to be a typical force distribution when a truck backs against prior art push rolls. As all slack is taken up, there is a sudden impulse transmitted between the truck and the load receiving apparatus 15. The tires 16 are substantially solid because of the extreme load of material carried by such a truck. Consequently any difference in motion remaining between the truck and the load receiving apparatus is substantially opposed and translated into an impulse type force. It is believed that extreme values of such impacting force may cause sudden movement of the load receiving apparatus 15. Such movement is believed to be sufficient to cause, for example, defects in new pavements when the force is transmitted to a paver.

Graph "B" represents a damped force distribution as a result of the embodiment including the spring 28, as described with respect to FIGS. 1 and 2. Graph "B" further applies to the hydraulic equivalent of the accumulator as described with respect to the preferred embodiment in reference to FIGS. 3, 4 and 5. In both instances, a force level FP is indicated to represent the force required by the load receiving apparatus 15 to push the truck forward by means of the push rolls after initial contact transients have become balanced On the time scale, to represents the rest state of the load receiving apparatus. The base time line may be at an initial bias force of the spring 28 or the accumulator 90 as described herein. As the forces increase at t1, relative deceleration between the truck and the load receiving apparatus take place. Without resilient force accumulation or energy storage, at t2 a peak impact force is reached. The spring or accumulator 28 or 90 delay the rise of the impact force, as indicated by t4, while t5 represents an ultimate time at which transient forces have become balanced.

Graph "C" represents a variation of graph "B" as a result of the operation of the needle valve 109. Bleeding hydraulic fluid from the extension chambers 84 is believed to suppress the force build up in the accumulator 90, thereby slowing the change of relative motion between the truck and the load receiving apparatus 15. Consequently the graph "C" shows an initially lower resulting force. However, when the valve 95 is moved to the neutral position 102, the effect of the accumulator is invoked. Inasmuch as the truck has during this initial time already adjusted its relative speed substantially to that of the load receiving apparatus, the energy transfer to the accumulator appears less.

Various changes and modifications in the structure of the described embodiment are possible without departing from the spirit and scope of the invention as defined by the terms of the claims appended hereto and reasonable equivalents thereof.

What is claimed is:

1. A device for cushioning a contact between a travelling paving machine equipped with a hopper for receiving paving material and a truck carrying paving material to be deposited in the hopper, the truck being equipped with a tire, the device comprising:
   A. contacting means, connected to the paving machine, for contacting the truck and for applying to the truck a force tending to move the truck in a direction in which the paving machine is travelling, the contacting means movable between an extended position for initially containing the truck and a retracted position;
   B. cushioning means, connected to the contacting means and to the paving machine, for cushioning the force applied to the truck and the force applied to the paving machine by the contact between the contacting means and the truck;
   C. latch means, connected to one of the paving machine and the contacting means, for latching the contacting means in the retracted position, the latch means having a latched state and an unlatched state; and
   D. restoring means, connected to the contacting means and to the paving machine, for restoring the contacting means to the extended position.

2. The device of claim 1 wherein the latch means comprises:
   A. a hydraulic cylinder connected to one of the paving machine and the contacting means;
   B. a piston movable within the hydraulic cylinder, the piston having a free end, the free end of the piston connected to the other of the paving machine and the contacting means;
   C. restraining means for restraining the piston from moving within the hydraulic cylinder, the restraining means having an inactive state in which the restraining means permits the piston to move within the hydraulic cylinder and an active state in which the restraining means restrains the piston from moving within the hydraulic cylinder; and
   D. means for placing the restraining means in the active state in response to the movement of the contacting means to the retracted position.

3. The device of claim 1, further comprising:
   A. a latch release control disposed to be operable by the operator of the paving machine; and
   B. latch release control means, connected to the latch means, for placing the latch means in the unlatched state in response to a single from the latch release control.

4. The device of claim 1 wherein the cushioning means comprises a hydraulic cylinder.

5. The device of claim 1 wherein the restoring means comprises a hydraulic cylinder.

6. The device of claim 1, further comprising:
   A. a restoring control disposed to be operable by the operator of the paving machine; and
   B. restoring control means, connected to the restoring means, for actuating the restoring means to restore the contacting means to the extended position in response to a signal from the restoring control.

7. The device of claim 1 wherein the contacting means is adapted to contact a tire of the truck.

8. A device for cushioning a contact between a travelling paving machine equipped with a hopper for receiving paving material and a truck carrying paving material to be deposited in the hopper, the truck being equipped with a tire, the device comprising:
   A. contacting means, connected to the paving machine, for contacting the truck and for applying to the truck a force tending to move the truck in a direction in which the paving machine is travelling, the contacting means movable between an extended position for initially containing the truck and a retracted position;
   B. cushioning means, connected to the contacting means and to the paving machine, for cushioning the force applied to the truck and the force transmitted to the paving machine by the contact between the contacting means and the truck;
   C. force modulating means, connected to the cushioning means and to the paving machine, for modulating the force applied to the truck and the force applied to the paving machine by the contact between the contacting means and the truck; and
   D. restoring means, connected to the contacting means and to the paving machine, for restoring the contacting means to the extended position.

9. The device of claim 8 wherein the force modulating means comprises:
   A. a hydraulic cylinder;
   B. a piston movable within the hydraulic cylinder, the piston defining a front chamber and a rear chamber within the hydraulic cylinder, the front chamber containing hydraulic fluid at a first pressure, and the rear chamber containing hydraulic fluid at a second pressure; and
   C. pressure modulating means for modulating the difference between the first pressure and the second pressure.

10. The device of claim 8, further comprising:
    A. a force modulating control disposed to be operable by the operator of the paving machine; and
    B. force modulating control means, connected to the force modulating means, for controlling the extent to which the force modulating means modulated the force applied to the truck and the force applied to the paving machine by the contact between the contacting means and the truck, the force modulating control means responsive to a signal from the force modulating control.

11. The device of claim 8, further comprising latch means, connected to one of the paving machine and the contacting means, for latching the contacting means in the retracted position, the latch means having a latched state and an unlatched state.

12. The device of claim 9, further comprising:
   A. a pressure modulating control disposed to be operable by the operator of the paving machine; and
   B. pressure modulating control means, connected to the pressure modulating means, for controlling the extent to which the pressure modulating means modulates the difference between the first pressure and the second pressure, the pressure modulating control means responsive to a signal from the pressure modulating control.

13. The device of claim 11 wherein the latch means comprises:
   A. a hydraulic cylinder connected to one of the paving machine and the contacting means;
   B. a piston movable within the hydraulic cylinder, the piston having a free end, the free end of the piston connected to the other of the paving machine and the contacting means;
   C. restraining means for restraining the piston from moving within the hydraulic cylinder, the restraining means having an inactive state in which the restraining means permits the piston to move within the hydraulic cylinder and an active state in which the restraining means restrains the piston from moving within the hydraulic cylinder; and
   D. means for placing the restraining means in the active state in response to the movement of the contacting means to the retracted position.

14. The device of claim 11, further comprising:
   A. a latch release control disposed to be operable by the operator of the paving machine; and
   B. latch release control means, connected to the latch means, for placing the latch means in the unlatched state in response to a single from the latch release control.

15. The device of claim 13, further comprising:
   A. a restraint control disposed to be operable by the operator of the paving machine; and
   B. restraint control means, connected to the restraining means, for placing the restraining mean in the inactive state in response to a signal from the restraint control.

16. The device of claim 8 wherein the cushioning means comprises a hydraulic cylinder.

17. The device of claim 8 wherein the restoring means comprises a hydraulic cylinder.

18. The device of claim 8, further comprising:
   A. a restoring control disposed to be operable by the operator of the paving machine; and
   B. restoring control means, connected to the restoring means, for actuating the restoring means to restore the contacting means to the extended position in response to a signal from the restoring control.

19. The device of claim 8 wherein the contacting means is adapted to contact a tire of the truck.

* * * * *

UNITED STATES PATENT AND TRADEMARK OFFICE
CERTIFICATE OF CORRECTION

PATENT NO. : 5,286,138
DATED : February 15, 1994
INVENTOR(S) : Jon D. Goodwin

It is certified that error appears in the above-identified patent and that said Letters Patent is hereby corrected as shown below:

In Column 7, line 50: after "resulting", delete "31".

In Column 9, line 36: delete "10" and insert --107-- therefor.

In Column 9, line 38: after "will", insert --be--.

In Column 10, line 64: delete "to" and insert --t0-- therefor.

In Column 11, line 36: delete "containing" and insert --contacting-- therefor.

In Column 12, line 6: delete "single" and insert --signal-- therefor.

In Column 12, line 29: after "in", delete "a" and insert --the-- therefor.

In Column 12, line 32: delete "containing" and insert --contacting-- therefor.

In Column 14, line 9: delete "single" and insert --signal-- therefor.

UNITED STATES PATENT AND TRADEMARK OFFICE
CERTIFICATE OF CORRECTION

PATENT NO. : 5,286,138

DATED : February 15, 1994

INVENTOR(S) : Jon D. Goodwin

It is certified that error appears in the above-indentified patent and that said Letters Patent is hereby corrected as shown below:

In Column 14, line 15: delete "mean" and insert --means-- therefor.

Signed and Sealed this

Ninth Day of August, 1994

Attest:

BRUCE LEHMAN

Attesting Officer      Commissioner of Patents and Trademarks